Feb. 11, 1936.  R. A. MILLER  2,030,168
RIVET

Original Filed Aug. 28, 1931

INVENTOR.
Ralph A. Miller.
BY
Harness, Dickey, Pierce & Hann.
ATTORNEYS.

Patented Feb. 11, 1936

2,030,168

UNITED STATES PATENT OFFICE 2,030,168

RIVET

Ralph A. Miller, Detroit, Mich., assignor to Huxon Holding Corporation, a corporation of Michigan Original application August 28, 1931, Serial No. 559,826. Divided and this application July 22, 1935, Serial No. 32,547

13 Claims. (Cl. 85—37)

The invention relates generally to rivets and particularly constitutes a division of the subject matter embodied in Miller application, Serial No. 559,826, filed August 28, 1931.

Generally, the invention relates to a two-part type of rivet including a tubular member and a pin extending through the tubular member. This pin has means on one end for applying axial forces to one end of the tubular member and when the opposite end of the tubular member is held and the same end of the pin is pulled, the axial forces directed against the first mentioned end of the tubular member causes an adjacent portion of the tubular body to bulb into a head. More particularly, this type of rivet is adapted to be inserted and set from one side and a head has been provided on the end of the pin for applying the axial forces mentioned. Since the rivet is adapted to be inserted and set from one side, necessarily the head on the pin, as well as the adjacent end of the tubular member, must be of such dimensions that both parts will pass through the opening in the structure to be riveted.

One object of the present invention is to provide a rivet of this character wherein the head on the pin is of such dimensions that it may pass through the opening in the structure to be riveted and wherein spreader means are employed for increasing the effective size of the head during the rivet setting operation.

Another object of the invention is to provide a rivet of the above designated character having spreader means for increasing the effective abutment between the end of the pin and the adjacent end of the tubular member and wherein the spreader means expands during the application of the forces against the end of the tubular member.

Other objects of the invention will become apparent from the following specification, the drawing relating thereto, and from the claims hereinafter set forth.

For a better understanding of the invention, reference may be had to the drawing, wherein.

Figures 1, 2:
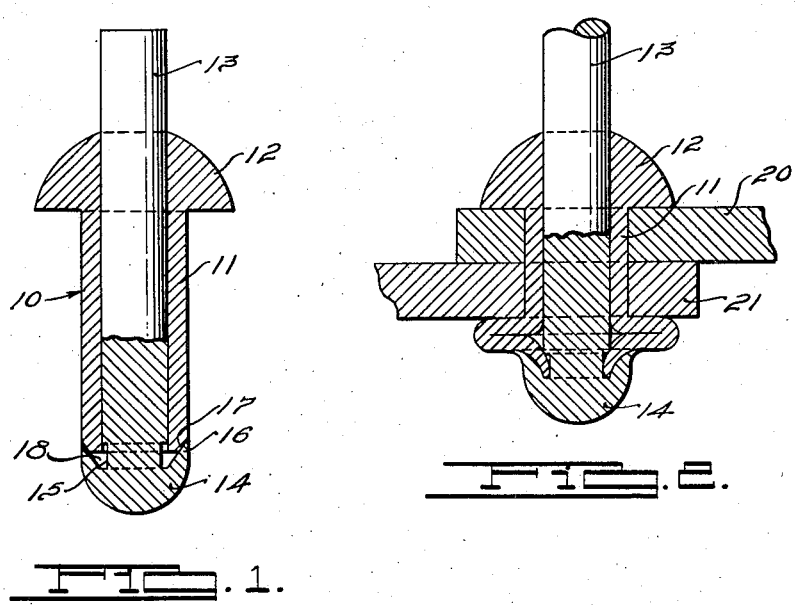
Figure 1 is a cross sectional view of a rivet constructed according to one form of the invention.
Fig. 2 is a cross sectional view of the rivet after it has been set in openings in a structure.

In the construction illustrated, the tubular member is indicated at 10 and comprises a cylindrical body 11 having a rivet head 12 at one end. Both of these parts of the tubular member are provided with a longitudinally extending opening of substantially uniform diameter which receives a pin 13, the diameter of which is substantially equal to that of the opening. The pin projects beyond the head 12 to provide an end portion for gripping and pulling purposes and the opposite end of the pin has a head 14 for applying axial forces against the adjacent end of the body 11. Adjacent the head 14 the pin has an annular groove 15 and an annular undercut flange 16 extending over this groove and outer portion of this flange engages a beveled edge 17 on the adjacent end of the body 11. It will be noted that an annular recess 18 is provided by the flange 16, the end of the body 11 inwardly of the bevel 17 and the groove 15.

Initially, the head 14 and flange 16, as well as the body 11, are of such dimensions that the assembly may be inserted from one side of a structure to be riveted until the head 12 engages the insertion or working side of the structure.

Referring to Fig. 2 the structure to be riveted is illustrated as comprising plates 20 and 21 having coinciding openings for receiving the rivet in its unset condition. After insertion of the rivet, the pin 13 is pulled and the reactionary force is applied against the head 12. When the pin is so pulled and the reactionary force is applied against the head 12, the beveled portion 17 of the tubular body 11 will move along the inclined surface of the undercut portion 16 and into the recess 19 and groove 15. This locks the pin to the end of the body 11 and facilitates bulbing of that portion of the body projecting outwardly from the plate 21. During this bulbing operation, the undercut portion 16 is deflected outwardly as shown in Fig. 2 and this prevents the head from shearing and passing through the tubular body. It is also apparent that this outward deflection of the flange 16 on the head 14 increases the effective size of the head and the size of the abutment against the end of the tubular member. In other words, during the application of the axial forces, the flange 16 expands or spreads outwardly to provide a more effective and larger operative engagement between the head on the pin and the end portion of the tubular member.

It may be mentioned that the tubular member is constructed of metal relatively ductile as compared with the metal in the pin. Various examples of metals and conditions that may be employed or may be present have been set forth in the parent application for patent and it seems unnecessary to repeat them in this divisional case.

Although only one form of the invention has been illustrated and described in detail, it will be apparent to those skilled in the art that various modifications may be made, without departing from the scope of the appended claims.

What is claimed is:

1. A rivet comprising a tubular member, a pin extending through the tubular member and having a head at one end for applying axial forces to the adjacent end to the tubular member when the pin is moved relative to the latter and spreader means for enlarging the effective diameter of the head during application of axial forces against the end of the tubular member through the head.

2. A rivet comprising a tubular member, a pin extending through the tubular member and having a head at one end for applying axial forces to the adjacent end of the tubular member when the pin is moved relative to the latter and spreader means adapted to expand outwardly so as to increase the effective diameter of the head during application of axial forces against the end of the tubular member through the head.

3. A rivet comprising a tubular member, a pin extending through the tubular member, and means on one end of the pin for applying axial forces to the adjacent end of the tubular member, and including means expansible by and during the application of such forces.

4. A rivet comprising a tubular member, a pin extending through the tubular member, abutment means on one end of the pin for engaging and applying axial forces to the adjacent end of the tubular member, and means rendering said abutment means expansible during the application of axial forces to the end of the tubular member so as to, in effect, increase the size of the abutment means.

5. A rivet comprising a tubular body, a shank in the body and having a head engaging one end of the body, the head having undercut portions adapted to flare outwardly when the head is moved against the body.

6. In combination, a tubular rivet member adapted to be inserted and set from one side of a structure and having a body portion adapted to project through openings in the structure, a tubular portion having a continuously annular wall adapted to project from that side of the structure opposite the insertion side, a member extending through and engaging the outer end of the latter portion for applying axial forces thereto to bulb the tubular portion when the last mentioned member is pulled from the insertion side and the end of the tubular member at the same side of the structure is held by the reactionary force of the pull, and means on said last mentioned member at the outer end of the tubular portion which is adapted to become larger in radial dimensions to provide a greater abutment against the end of the tubular portion when said last mentioned member is pulled for the purpose of forming the bulbed head.

7. A rivet comprising a tubular member adapted to project through openings in a structure to be riveted, and beyond one side of the structure, a pin extending through the tubular member and means on the pin for engaging the projecting end of the tubular member, when the pin is moved through the tubular member, said means being of such character as to become radially enlarged upon forceful engagement with the end of the tubular member.

8. A rivet as an article of manufacture which is adapted to be inserted and set from one side of a structure to be riveted, comprising a tubular rivet member, a shank extending through such member, and a substantial flange on said shank extending axially over an outer surface portion of one end of the member, the dimensions of such flange being such as to permit initial insertion thereof through the opening in the structure to be riveted.

9. A rivet as an article of manufacture which is adapted to be inserted and set from one side of a structure to be riveted, comprising a tubular rivet member, a shank extending through such member, a substantial flange on said shank extending axially over an outer surface portion of one end of the member, said flange being annular in character, and in conjunction with the shank part within the tubular member, defining inner and outer supporting walls for such end part of the tubular member.

10. A rivet as an article of manufacture which is adapted to be inserted and set from one side of a structure to be riveted, comprising a tubular rivet member, a shank extending through such member, and a substantial flange on said shank extending axially over an outer surface portion of one end of the member, said flange comprising material less ductile than that of the tubular member.

11. A rivet as an article of manufacture which is adapted to be inserted and set from one side of a structure to be riveted, comprising a tubular rivet member having an end portion of reduced outer diameter, a shank member extending through such tubular member, and a head on such shank having a substantial portion extending axially over an end of such tubular portion of reduced outer diameter, the dimensions of such portion of the shank being such as to permit initial insertion thereof through the opening in the structure to be riveted.

12. A rivet comprising a tubular member having a portion adapted to be expanded into a head by axial forces, a pin extending through the member, and means on one end of the pin for applying axial forces to the end of said portion and including means expansible by and during the application of such forces.

13. A rivet comprising a tubular member having a continuously annular portion adapted to be bulbed into an annular head by axial forces, a pin extending through the member, abutment means on one end of the pin for engaging and applying axial forces to the end of such portion, and means rendering the abutment means expansible during the application of axial forces to the end of such portion so as to, in effect, increase the size of the abutment means.

RALPH A. MILLER.